V. Draper,
Making Ornamental Chains.
Nº 42,907.  Patented May 24, 1864.
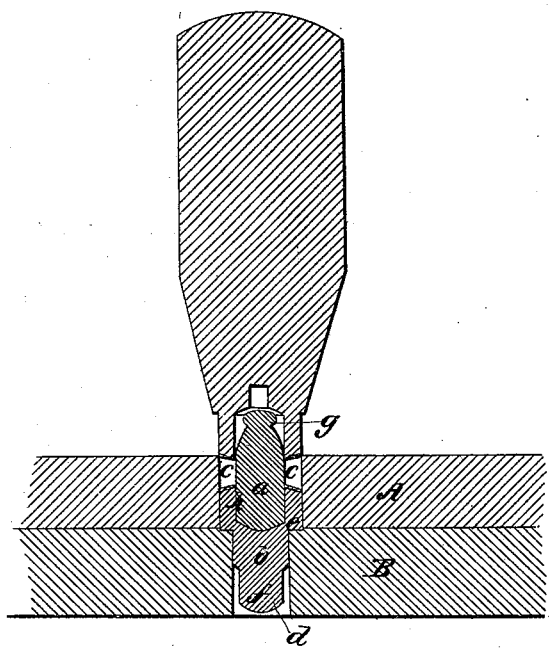
Witnesses
H. D. Hale Jr
Frederick Curtis
Inventor.
Virgil Draper
per his attorney
R. H. Eddy

UNITED STATES PATENT OFFICE.

VIRGIL DRAPER, OF NORTH ATTLEBOROUGH, MASSACHUSETTS, ASSIGNOR TO OSCAR M. DRAPER, OF SAME PLACE.

IMPROVEMENT IN STAMPING, &c., METAL.

Specification forming part of Letters Patent No. 42,907, dated May 24, 1864.

*To all whom it may concern:*

Be it known that I, VIRGIL DRAPER, a resident of North Attleborough, in the county of Bristol and State of Massachusetts, have invented a new and useful Improvement in Dies or Mechanism for Swaging or Stamping Metallic Chain Links or Rings; and I do hereby declare the same to be fully described in the following specification and represented in the accompanying drawing, which denotes a vertical section of the apparatus complete.

The nature of my invention consists in the combination of a separate centering piece with a punch or movable bed-die and mold plate or plates, constituting a mechanism for swaging chain links or blanks therefor, for the purpose of finishing and ornamenting them.

In the said drawing, A and B are two plates of steel, one of which—viz, A—is placed on the other. A cavity or hole, $c$, to correspond with the outside form of the link to be swaged, is made through the upper plate, A. There is also a cylindrical hole or socket, $d$, made through the part B. The socket $d$ receives a separate bed die, $b$, which is formed not only with a shoulder, $e$, to rest on the plate B, but having a tenon, $f$, extending downward from it, and being of a size to enter a socket, $g$, made in a punch, C. The lower surface of the punch C, as well as the upper surface of the bed die $b$, may be engraved or enchased with the proper devices to be stamped on a ring when placed within the space $c$. The said punch C at its lower part is to fit the cavity or chamber $c$, or correspond with it in diameter; and, furthermore, it is to be provided with the cylindrical cavity $g$ to receive a separate centering piece, $a$, which, when in place within the cavity $g$, projects from and beyond it, as shown in the drawing. There is also in the bed-die $b$ a cavity, $h$, within which the centering piece $a$ is inserted and sustained, and from which it may be removed at pleasure.

From the above it will be seen that the parts A, B, C, $a$, and $b$ are separate from one another. In operating with them a chain, ring, or link to be swaged is first to be placed within the cavity $c$, and so as to encompass the centering piece $a$, placed within the cavity $h$, and projecting above the bed-die $b$.

Next the punch C is to be forced or driven down upon the ring with great power, so as to compress the ring between it and the die $b$, and not only finish the circumference of the ring by spreading it laterally against the sides of the cavity $c$, but produce on the sides of the ring the necessary ornamentation or figures. After this has been accomplished it becomes necessary to remove the ring from the matrix $c$ and the centering piece $a$.

The separation of the ring from the matrix $c$ can be accomplished by forcing the bed die $b$ upward, so as to drive the ring out of the matrix. This movement of the die $b$ may be accomplished by means of the punch C, which, on being inserted in the cavity $d$ and pressed or driven smartly against the bed-die, will force it and the ring through the mold-matrix or cavity $c$. In its movement out of the cavity $c$ the ring will take with it the centering piece $a$, which afterward may be readily separated from the ring by means of the punch or by driving it out of the ring by a mallet or hammer. Were the centering piece $a$ fixed to the bed-die $b$, or were they made in one piece of metal, it would be difficult to remove the ring from the said die and the centering piece after the operation of swaging the said ring had been effected, because the condensation of the ring by the punch would cause it to adhere so closely to the die $b$ and the centering piece $a$ as to render it no easy matter to separate it (the ring) from the two without doing injury to the ring. Therefore it will be seen that the separate or removable centering piece $a$, applied to and used as above described, in connection with the punch C, the bed-die $b$, and the mold-plates A and B, constitute an important improvement in dies for swaging chain-links or articles of like character.

I claim as my invention—

The combination of the separate centering piece $a$ with the punch C, the die $b$, and the mold plates A B, or their mechanical equivalent, the whole being substantially as specified.

VIRGIL DRAPER.

Witnesses:
ANN W. DRAPER,
HENRY RICE.